Feb. 15, 1955  E. H. SMITH  2,702,079
CUTTING AND WELDING TORCH
Filed Nov. 4, 1950

INVENTOR.
ELMER H. SMITH
BY Paul, Paul & Moore
ATTORNEYS

United States Patent Office 2,702,079
Patented Feb. 15, 1955

2,702,079

CUTTING AND WELDING TORCH

Elmer H. Smith, Minneapolis, Minn., assignor to Smith Welding Equipment Corporation, Minneapolis, Minn., a corporation of Minnesota Application November 4, 1950, Serial No. 194,102

5 Claims. (Cl. 158—27.4)

This invention relates to new and useful improvements in cutting and welding torches of the general type disclosed in my co-pending application Serial No. 67,116, filed December 24, 1948, now U. S. Patent No. 2,552,873.

An object of the present invention is to provide a cutting and welding torch wherein the torch tip has a slip-fit in the torch head and is secured therein by a suitable retaining member having means for interlockingly engaging means on the torch head.

A further object of the invention is to provide a torch head and tip assembly having means whereby the tip may be detachably secured in the torch head without the use of metal-to-metal seats.

A more specific object is to provide a torch tip comprising spaced apart resilient sealing elements which are engageable with annular seats provided in the torch head, when the tip is slipped into the bore of the torch head and secured therein, said resilient sealing elements cooperating to prevent leakage between the high and low pressure gas passages and also leakage of the combustible gases to the atmosphere.

A further object is to provide a torch tip comprising an enlarged cutting gas passage and a plurality of fuel gas passages adapted to communicate respectively with the cutting and fuel gas passages in the torch head, said tip being provided with axially spaced annular grooves each having a resilient, heat-resistant sealing element permanently supported therein adapted to engage complemental seats provided in the torch head, when the tip is slidably fitted into the bore in the head and secured in position therein.

Other objects of the invention reside in the simple and inexpensive construction of the torch tip and head assembly, whereby said parts may be manufactured in large quantities at low cost; in the provision of a torch tip provided with one or more resilient heat-resistant, annular sealing elements which are permanently secured to the torch tip body whereby they become, in effect, an integral part thereof; in the unique mounting of the resilient sealing elements in the annular grooves of the torch tip whereby said sealing elements are protected against damage, when the tip is detached from the torch head; in the V-shaped annular seats provided in the torch head with which the resilient sealing elements are engaged when the tip is slipped into the torch head and secured therein; and in the construction of the axially spaced annular seats provided in the torch head which are formed on the outwardly projecting faces of axially spaced flanges which are receivable in the annular grooves provided in the torch tip body, and cooperate with said grooves to provide closed annular chambers for supporting said sealing elements, and whereby when the tip is slipped into the bore in the torch head, and the securing member for the torch tip is manipulated, said sealing elements are compressed within their respective chambers to positively prevent leakage between the high and low gas passages within the torch head, and also whereby leakage of the gases to the atmosphere is positively eliminated.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Figure 1:
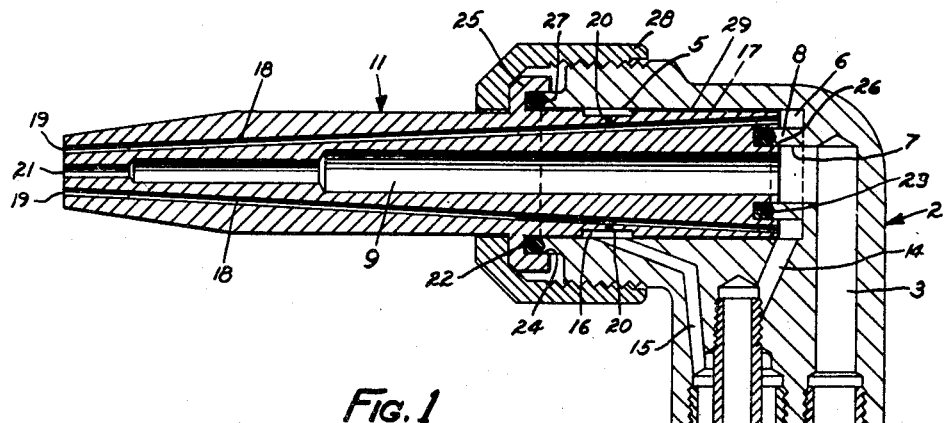
Figure 1 is a sectional elevation of the novel torch head and tip assembly of the present invention.
Figure 2:
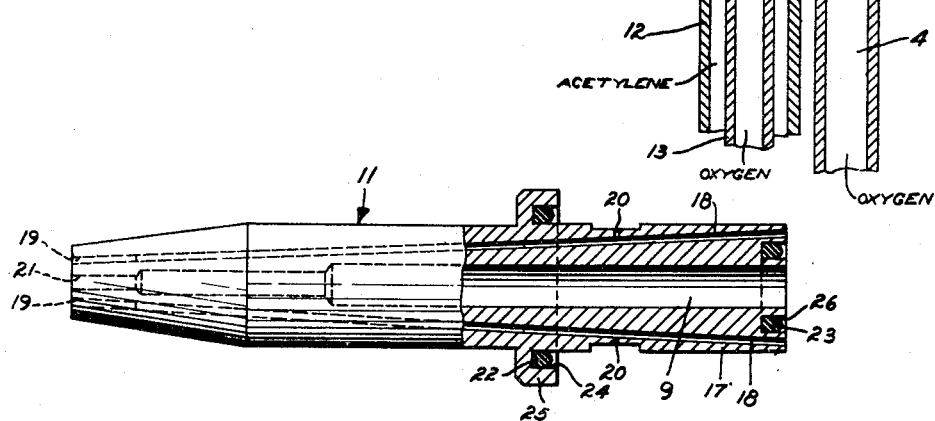
Figure 2 is a view showing the tip removed from the torch head, with one end being broken away to more clearly illustrate the construction thereof.

The novel torch head and tip assembly herein disclosed is shown comprising a torch head 2 having a high pressure cutting gas passage 3 therein which communicates with one end of a conduit 4, the opposite end of which is connected to a suitable supply of oxygen under pressure, as is well known.

The head 2 has an enlarged bore 5 terminating at its bottom in an annular recess 6 and a reduced bore 7 which cooperate to provide an axially disposed flange 8. The reduced bore 7 establishes communication between the high pressure gas passages of the torch head and the cutting gas passage 9 of a torch tip, generally designated by the numeral 11. Conduits 12 and 13 each have one end secured in the head 2, and cooperate with conduit 4 to provide, in effect, a handle whereby the torch may be conveniently manipulated. The opposite end of conduit 12 is connected to a suitable source of fuel gas such as acetylene, or any other fuel gas suitable for the purpose, and the opposite end of conduit 13 is similarly connected to a source of combustion supporting gas such as oxygen, not shown, in the drawing. Suitable control valves, not shown, are provided for regulating the flow of fuel gases through the conduits 12 and 13.

A duct 14 establishes communication between the conduit 13 and the annular recess 6 provided in the torch head, and a duct 15 establishes communication between the relatively larger conduit 12 and an annular chamber 16 provided between the walls of the inner cylindrical end portion 17 of the torch tip and the bore 5, as clearly illustrated in Figure 1.

To facilitate explanation, the gas receiving end of the torch tip will hereinafter be referred to as the rear end of the tip, and the discharge end thereof as the front end of the tip.

The chamber 16 serves as a gas distributing chamber and is in communication with a plurality of preheating fuel passages 18 through a series of transverse ducts 20. The preheating ducts 18 extend from end to end of the tip and have their rear ends in communication with the annular recess 6. The opposite ends of the preheating fuel passages 18 provide preheating orifices 19, uniformly spaced apart around the cutting orifice 21 of the central cutting gas passage 9 of the tip, as is common in torches of this general type. The cutting gas passage 9 is preferably reduced in diameter in a forward direction, as shown in the drawing, thereby to provide a high velocity cutting orifice 21.

An important feature of the present invention resides in the construction of the sealing means provided for preventing leakage between the high and low pressure gases within the torch head, as well as leakage of the fuel gases to the atmosphere.

The novel sealing means herein disclosed is shown comprising a pair of sealing elements 22 and 23. Sealing element 22 is supported within an annular groove 24 formed within an enlarged collar 25 on the intermediate portion of the tip body.

Sealing element 23 is supported in a terminal groove 26 provided in the rear end of the tip body, as clearly illustrated on the drawing. The depth of the annular grooves 24 and 26 is relatively greater than the front-to-back dimension of their respective sealing elements, whereby the sealing elements are supported wholly within their respective grooves, so that they are not likely to become damaged, when substituting one tip for another. The sealing elements are slightly larger than their respective grooves, whereby they are compressed, cross-sectionally, when fitted into their respective grooves, whereby they are frictionally retained therein and, in effect, become an integral part of the tip.

Figure 3:
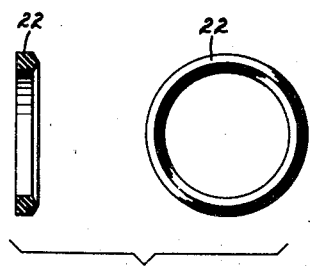
Figures 3 and 4 are detail views showing the construction of the two resilient heat resistant sealing elements.
Figure 4:
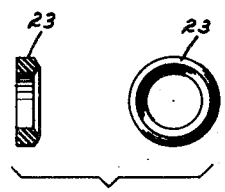

The exposed faces of the two sealing elements when supported within their respective grooves are V-shaped, as best illustrated in Figures 3 and 4. The forwardly facing edge of the flange 8 at the bottom of the bore 5 in the torch head, which constitutes a seat for sealing element 23 is correspondingly V-shaped, whereby when the sealing element 23 is forced against the face of flange 8, it is firmly compressed in its supporting groove to thereby prevent leakage of the high pressure oxygen gas into the annular fuel gas distributing chamber 6 at the rear end of the torch tip.

The relatively larger sealing element 22 engages a similarly shaped seat 27 provided at the open end of the enlarged bore 5 of the torch head. The spacing between the forwardly facing V-shaped seats of the torch head corresponds to the axial spacing between the sealing elements 22 and 23 on the tip body, so that when the tip is fitted into the torch head, as shown in Figure 1, the two sealing elements simultaneously engage their respective seats. The tip is retained in the head 5 by a retaining nut 28, shown received in threaded engagement with the head 2, as will readily be understood by reference to Figure 1.

The novel tip herein disclosed may readily and quickly be detached from the torch head by a slight rotation of the retaining nut 28, as the tip is fitted into the bore 5 of the head 2 by a sliding action. The tip retaining nut 28 need only be slightly tightened because of the unique construction of the sealing elements and their respective seats, and particularly because the sealing elements are completely confined within their respective grooves. By thus confining the sealing elements, a slight inward pressure exerted on the tip by manipulation of the retaining nut, after the sealing elements are moved into engagement with their respective V-shaped seats, will cause the sealing elements to become compressed against the walls of their supporting grooves and their V-shaped seats, thereby positively preventing leakage of the high pressure gas into the low pressure distributing chamber 6 of the torch head and leakage of the fuel gas mixture in the annular distributing chamber 16 to the atmosphere.

The cylindrical butt end of the tip has a loose sliding fit in the bore 5 similar to that provided for the tip in the torch shown in my above mentioned co-pending application. In other words, the fit between the butt end of the tip and the bore 5 is such as to provide a restricted annular space 29 whereby the torch tip is retained in leaktight engagement with the torch head without a metal-to-metal contact therewith. The portion of the tip which engages the periphery of the flange 8, and also the portion of the annular collar 25 which engages a portion of the periphery of the open end of the torch head does not serve to prevent leakage of the gases between these parts.

Cutting and welding torches have in the past few years become a necessary piece of equipment in the manufacturing industry, and are used for a great variety of jobs requiring frequent interchanging of the torch tips. It is therefore highly desirable that the tip be so designed that it may readily be interchanged without loss of valuable time. In the present instance, the tip may be readily secured in operative position in the torch head 2 by simply slipping the butt end thereof into the bore 5 of the torch head and slightly turning the retaining nut 28 with the fingers, as it is not necessary to utilize a wrench or other tool for manipulating said nut.

The relative diameters of the butt end 17 of the tip and the bore 5 of the torch head, as hereinbefore stated, are such that the tip may be freely slidable into or out of the bore 5. The unique design of the sealing elements is also such that they do not have a tendency to stick to their respective seats, whereby the tip may always be readily withdrawn from the bore 5 of the torch head when the nut 28 is unscrewed therefrom.

The foregoing detailed description has been given for clearness of understanding only, and no unnecessary limitations should be understood therefrom, but the appended claims should be construed as broadly as permissible in view of the prior art.

I claim as my invention:

1. An oxy-acetylene torch of the class described, comprising a head having an enlarged bore therein provided at its open end with an annular forwardly extending seat, the bottom of said bore having an annular forwardly extending flange defining an annular recess and a reduced bore which are axially aligned with said enlarged bore, the forwardly facing edge of said flange providing an annular seat, means in said head for establishing communication between a high pressure cutting gas and said reduced bore, a torch tip having a cylindrical butt end slidably receivable in the enlarged bore of the head, said tip having a high pressure cutting gas passage extending lengthwise therethrough and in communication with said reduced bore, a plurality of low pressure preheating gas passages therein, an enlarged transversely extending annular collar attached to said tip body intermediate the ends thereof and having an annular rearwardly facing groove formed therein, a rearwardly facing terminal annular groove formed in the extreme rear end of the cylindrical butt portion of the torch tip, resilient sealing elements supported in said grooves adapted to engage the forwardly facing seat provided at the open end of said enlarged bore and the seat at the bottom of said bore, and means for securing the tip in the torch head and whereby said sealing elements are compressed within their respective grooves to prevent leakage between the high and low pressure gases within and from the torch head.

2. In a torch head and tip assembly, a head having an enlarged bore therein provided at its open end with an annular seat and at its bottom with an annular forwardly extending flange defining an annular recess and a reduced bore which are axially aligned with said enlarged bore, the forward facing edge of said flange providing an annular seat, said forward faces of said open end annular seat and said forwardly extending flange in the bottom of the bore being concave, a torch tip having a cylindrical butt end receivable in said bore and of slightly smaller diameter than said bore to provide an annular restricted passage between the periphery of the butt end of the tip and the wall of the bore, the rear end of said tip having a rearwardly facing annular groove therein aligned with the annular seat at the bottom of the bore in said head, an enlarged collar attached to and transversely extending on the forward end of the cylindrical butt end of the tip having a rearwardly facing annular groove therein aligned with the seat defining the open end of said bore, and resilient sealing elements confined within the grooves in said tip and having exposed faces adapted to simultaneously engage said concave faces in the annular seats, when the butt end of the tip is slipped into the bore of the torch head and secured therein.

3. A torch head and tip assembly in accordance with claim 2, wherein the sealing elements are formed of resilient heat resistant material and are so sized, cross-sectionally, that they are compressed when fitted into their respective grooves in the torch tip, whereby they are normally frictionally retained in said grooves to permit the tip to be readily handled when removed from the torch head without danger of the sealing elements becoming detached therefrom.

4. In a torch head and tip assembly, a head having an enlarged cylindrical bore therein open at one end, an annular seat at the open end of said bore extending generally transverse to the longitudinal axis of said cylindrical bore, a relatively smaller annular seat at the bottom of said bore having a face extending generally transverse to the longitudinal axis of said cylindrical bore, a torch tip having a cylindrical butt end receivable in said bore preheating gas passages therein terminating at the butt and front ends of said tip, said terminal ends of the preheating gas passages in the butt end of said tip forming orifices for admission of low pressure oxygen, acetylene gas passages in said tip adjacent the forward end of the cylindrical butt end thereof and in communication with said preheating gas passages, the diameter of said butt end being slightly smaller than the diameter of said bore to prevent metal-to-metal contact between the wall of the bore and the periphery of the butt member and whereby an annular restricted passage is provided therebetween which is of such size as to minimize gas leakage therethrough in the event the pressures of the low pressure oxygen and acetylene gases entering into the torch tip are unbalanced, the cylindrical butt end of the tip having an enlarged transversely extending collar attached thereon adjacent its forward end having a rearwardly extending face aligned with the seat at the open end of the bore, said extreme rear end of said butt and the rearward face of said collar of the tip having annular grooves formed therein, and resilient sealing elements carried by said annular grooves in said tip, and positioned to simultaneously engage said seats, when the butt end of the tip is slipped into the bore of the torch end and secured therein.

5. In a torch head and tip assembly, a head having an enlarged cylindrical bore therein provided at its open end with an annular forwardly extending seat and at its bottom with an annular forwardly extending flange defining an annular recess and a reduced bore which are axially aligned with said enlarged bore, the forwardly facing edge of said flange providing an annular seat, means in said head for establishing communication between a high pressure cutting gas and said reduced bore, said annular recess providing for low pressure oxygen gas, a torch tip having a cylindrical butt end receivable in said bore and having a cutting gas passage therein in communication with the high pressure oxygen supply passage in said head, said tip also having a plurality of preheating gas passages extending lengthwise therethrough and communicating with said annular recess in said head, means in the torch head for supplying low pressure oxygen gas to said annular recess and the inner ends of the preheating gas passages in the torch tip, means providing an annular fuel gas distributing chamber around the cylindrical butt end of the torch tip adjacent to its forward end, orifice means for establishing communication between said annular fuel gas distributing chamber and the preheating gas passages in said tip, duct means in said head for supplying low pressure acetylene gas to said annular fuel gas distributing chamber of said tip, and the cylindrical butt end of the torch tip being slightly smaller in diameter than the diameter of the bore in the torch head, thereby to provide an elongated annular restricted passage between the inner ends of said preheating gas passages in said tip and said annular fuel gas distributing chamber around the torch tip, whereby said low pressure oxygen and acetylene gases are delivered to the preheating gas passages in the torch tip at axially spaced points for intermixing in said passages to provide a highly combustible fuel gas mixture for a preheating flame, means in the extreme inner end of the torch tip abutting said forwardly extending flange at the bottom of said bore in the head for preventing leakage of the high pressure oxygen into the annular recess at the bottom of said bore in the head adjacent the end of said annular restricted passage, said tip having a transversely extending collar fixed to the forward end of said butt portion thereof providing a rearwardly extending face for cooperation with said forwardly extending seat at the open end of the bore in said head, and sealing means disposed between said rearwardly extending face on the collar and the forwardly extending flange of said head whereby said restricted passage is sealed from the atmosphere.

References Cited in the file of this patent

UNITED STATES PATENTS

| | | |
|---|---|---|
| 1,071,585 | Rosseli | Aug. 26, 1913 |
| 1,282,416 | Harris | Oct. 22, 1918 |
| 2,368,716 | Marra | Feb. 6, 1945 |
| 2,518,895 | Jacobsson et al. | Aug. 15, 1950 |
| 2,535,873 | Smith | Dec. 26, 1950 |
| 2,614,616 | Villoresi et al. | Oct. 21, 1952 |

FOREIGN PATENTS

| | | |
|---|---|---|
| 410,208 | France | Mar. 9, 1910 |